Patented Oct. 17, 1944

2,360,376

UNITED STATES PATENT OFFICE 2,360,376

WATER-SOLUBLE PHENOLIC ADHESIVE RESIN AND METHOD

Clarence F. Van Epps, Lockport, N. Y., assignor to The Lauxite Corporation, Lockport, N. Y., a corporation of New York No Drawing. Application October 6, 1942, Serial No. 461,008

20 Claims. (Cl. 20—89)

This invention relates to an improved water-soluble phenolic adhesive resin especially adapted for making boil-resistant exterior grade hot-pressed plywood. The main object of the invention is to provide an adhesive phenolic resin of such superior reactivity as to be capable of being hot-pressed at a sufficiently lower temperature and with a sufficiently shorter pressing cycle than hitherto, so as to produce boil-resistant plywood of commercial moisture content directly upon discharge from the hot press without having to use a separate remoistening process after the pressing and without embrittlement of or injury to the wood during the pressing. Another object is to produce an aqueous liquid adhesive in "ready to use" form which combines the desired high reactivity with adequate stability for successful use without spoilage from spontaneous gellation. Another object is to produce a stable dry powder adhesive base capable of dissolving in water to produce a liquid adhesive having the foregoing properties. Another object is to produce phenolic resin-bonded plywood that is free from objectionable phenolic odor. Other objects and advantages of the invention will be pointed out in the subsequent description.

Hot-pressed plywood is extensively manufactured from protein glues based on such materials as soybean flour and blood, from urea resin adhesives and from phenolic resin adhesives. The properties and durability of the plywood vary according to the adhesive. The product glued with phenolic resin has proved highly desirable because the bond will survive almost unlimited exposure to moisture, heat and weather. However, the protein and urea resin adhesives have been much more reactive in the hot press and can be pressed at a substantially lower temperature and for a shorter time than the phenolic glue. The latter, besides being handicapped by low press capacity, has required such lengthy and drastic heat treatment that the panels come out of the press much too dry for use and must receive a costly and tedious remoistening to bring them back up to the necessary commercial range of between substantially six and ten percent moisture content. The remoistening must be slowly and carefully conducted to avoid producing panels which are either warped or have a tendency to warp subsequently. The severity of the hot press treatment also frequently embrittles the wood. Altogether, the use of phenolic resin glues has involved serious disadvantages. In contrast to these limitations, the protein and urea glues avoid all these difficulties and produce panels directly upon discharge from the hot press at desirable moisture content with high press capacity and without injuring the wood by excessive heat.

There has, accordingly, been a long-standing need in view of the well-recognized advantages of the phenolic resin bond of finding some way of producing such plywood without the remoistening step and its attendant very serious disadvantages of slow costly production with possible wood injury. After many experiments, I have finally solved the problem by providing a new type of water-soluble phenolic adhesive resin of high adhesive power which is so reactive that the panels can be pressed with considerably greater speed than hittherto and also at substantially lower temperature and the combined effect of this degree of reactivity at last permits the plywood to be brought out of the hot press at a high enough moisture content so that the old troublesome remoistening step becomes unnecessary.

The following examples illustrate the operation of the invention under a variety of conditions and with various materials. The examples should be construed as illustrating but not limiting the invention. The quantities of ingredients are by weight on a gram molecule basis to provide always one gram molecule of the phenol element so as to express clearly the essential molecular ratio between the phenol, formaldehyde and caustic soda. It is, of course, understood that in commercial practice the quantities of ingredients for a batch will be greatly increased but the proportions and molecular relationships expressed in the examples will be retained.

Example I

This example illustrates a preferred commercial procedure with commercially available materials where it is desired to produce the adhesive in convenient liquid form with a fairly short cooking cycle.

|  | Grams |
|---|---|
| Barrett's 90–92% technical phenol | 94 |
| Formalin (37% formaldehyde by weight) | 182 |
| Caustic soda | 14.5 |
| Water | 14.5 |

Ratio to one molecule of phenol:

|  | Molecules |
|---|---|
| Formaldehyde | 2.25 |
| Caustic soda | 0.36 |

The water and caustic soda were mixed and cooled to room temperature. All the ingredients were then added to a reaction vessel provided with a reflux condenser and efficient heating, cooling and stirring device, and were reflux-boiled for about 47 minutes, care being taken to heat the mixture to boiling in less than about 5 minutes and to cool the product to room temperature in less than about 15 minutes. Throughout the cooking, the material remained clear and homogeneous without any emulsification or separation into an oily and watery phase. The glue was a clear water-soluble syrup having a viscosity of about 2000 centipoises which may be varied if desired between about 1600 and 2300 centipoises, the lower viscosity being obtained with shorter cooking or more rapid cooling. The water content was about 43%.

One hundred parts of the above glue were mixed with five parts of 300 mesh red fir wood flour (about 9.5% on the basis of the resin solids present) and the mixture, which then had a viscosity of about 6000 centipoises, due to the addition of the wood flour, was ready for use in the glue spreader. Plywood panels made of 3-ply 1/16 inch Douglas fir veneer at about 5% moisture content were spread at the rate of about 60 pounds of wet glue per thousand square feet of double glue line. Fifteen minutes after spreading, some of the panels were hot-pressed for three minutes singly in hot press openings at about 260° F. and other panels were pressed for 7.5 minutes with two panels in each opening, using a hydraulic pressure of 200 pounds per square inch. With either pressing method, the plywood on discharge from the press had a moisture content ranging between 6.5 and 7.5% which eliminated any requirement for remoistening. The panels were closely piled immediately as received from the hot press and allowed to stand until cool.

The plywood was then tested according to the Douglas Fir Plywood Association's "Alternate Boil Test for Exterior Plywood" (Bureau of Standards Bulletin C. S. 45-40). The specimens were boiled for 4 hours, dried for 16 hours at 145° F., boiled for an additional 4 hours, and then shear-tested while wet. All the panels readily passed the test, showing especially high shear strength and wood failure, the latter being well in excess of the 60% minimum required by the test. It was noted also that the plywood was free from the odor of phenol.

Example II

This example illustrates the operation of the invention with C. P. phenol.

|  | Grams |
|---|---|
| C. P. phenol | 94 |
| Formalin | 243 |
| NaOH | 20 |
| Water | 20 |

Ratio to one molecule of phenol:

|  | Molecules |
|---|---|
| Formaldehyde | 3.00 |
| Caustic soda | 0.50 |

The mixing and cooking procedures of Example I were followed except that the time of reflux-boiling was 35 minutes. The viscosity was about 4600 centipoises and the water content about 46%.

One hundred parts of the resulting adhesive resin were mixed with wood flour and fir plywood was made the same as in Example I, remoistening being avoided and equally good results being obtained after the alternate boil test. The plywood was substantially free from phenolic odor.

Example III

This example illustrates the use of excess water to increase the quantity of adhesive product.

|  | Grams |
|---|---|
| Barrett's 90-92% technical phenol (8% water content) | 103 |
| Formalin | 174 |
| NaOH | 18 |
| Water | 90 |

Ratio to one molecule of phenol:

|  | Molecules |
|---|---|
| Formaldehyde | 2.15 |
| Caustic soda | 0.45 |

The material was treated as in Example I except that the reflux-boiling period was 77 minutes. The adhesive resin had a viscosity of about 2390 centipoises and a water content of about 53%. This material was mixed with wood flour and used in making fir plywood as in the previous examples with equally good test results.

Example IV

This example illustrates a procedure which I have found successfully produces a water-soluble spray dried powder of satisfactory stability notwithstanding the extreme reactivity of the condensation product. It is noted that, while the liquid adhesive resins produced by all the other examples have sufficient stability to permit a storage life at 70° F. of about two weeks or more without undue thickening from spontaneous polymerization, the dry powder of the present example, if dried to a low moisture content and stored in air-tight containers at room temperature, has a storage life of at least six months. This degree of stability is remarkable in view of the extreme reactivity of this type of adhesive resin which contains both a high ratio of formaldehyde to phenol and also a considerable content of caustic soda, both of which elements I find usually contribute a tendency towards rapid self-polymerization.

|  | Grams |
|---|---|
| Barrett's 90-92% technical phenol | 94 |
| Formalin | 243 |
| Caustic soda | 24.8 |
| Water | 24.8 |

Ratio to one molecule of phenol:

|  | Molecules |
|---|---|
| Formaldehyde | 3.00 |
| Caustic soda | 0.62 |

The formalin was placed in the cooking vessel and the phenol was warmed slightly to liquefy it and then added to the formalin and the mixture cooled to room temperature. The cooled solution of the caustic soda in the water was then added very slowly to the mixture while stirring, with a slight cooling action applied to the cooking vessel in order to avoid excess exothermic heat. Heat was then applied to the cooker cautiously to bring the temperature up to about 140° F. The heat was then cut off and the mixture allowed to heat by its own exothermic reaction to 170° F. which temperature was reached in about six minutes. The temperature was held at 170° F. for about 90 minutes and the mixture immediately cooled and transferred to a storage tank for spray drying.

The specific gravity of the product was 1.182 and the pH 9.6. It is to be noted that the viscosity was extremely low, being about 3.5 centipoises due to the low temperature cook and the high caustic soda ratio. This low viscosity of the initial material was desired both to provide a highly fluid feed for the spray dryer and also to allow for some further reaction taking place during the spray drying. Before spray drying, approximately 58 grams of water were added to the mixture to improve further the fluidity and consequent atomization. The mixture was then spray dried in a pressure nozzle type of dryer using a drying temperature of 205° F., the liquor being sprayed under a pressure of 3650 pounds per square inch through four #76 drill size nozzles. The dryer was equipped for continuous removal and cooling of the powder as produced.

The powder was well dried, very soluble in water, and, when mixed in a ratio of 100 parts by weight to 60 parts water, formed a syrup having a viscosity of about 260 centipoises. This syrup with wood flour added was used as a hot press glue. The plywood was of similar character to that produced by the previous examples and gave equally satisfactory test results.

Example V

This example illustrates the use of a sufficiently high molecular proportion of caustic soda and a corresponding cooking treatment whereby, notwithstanding the essential high molecular ratio of formaldehyde, odor of uncombined formaldehyde is eliminated from the product by a secondary reaction, and a product of good adhesive properties, exceptional reactivity and improved storage life is obtained.

|  | Grams |
|---|---|
| Barrett's 90–92% technical phenol (8% water content) | 103 |
| Formalin | 243 |
| NaOH | 30 |
| Water | 30 |

Ratio to one molecule of phenol:

|  | Molecules |
|---|---|
| Formaldeyhde | 3.00 |
| Caustic soda | 0.75 |

The material was treated as in Example I, bringing it to a reflux boil in 12 minutes, the boiling under reflux being continued for 45 minutes at approximately 202° F. At the end of about 30 minutes of refluxing, a secondary exothermic reaction commenced which lasted for about 5 minutes and required a moderate amount of cooling to keep under control. At the end of 45 minutes, the material was cooled to room temperature in about 15 minutes. The adhesive resin had a viscosity of about 2900 centipoises and a water content of about 45%. In contrast to the products of all the previous examples, the odor of formaldehyde was absent in this product and it had a pleasant, aromatic, slightly alcoholic odor. The absence of irritating odor of formaldehyde eliminated need for special ventilating equipment around the glue spreader in the plywood plant.

This material, when mixed with wood flour and used in making fir plywood as in the previous examples, gave equally good results. It was noted, however, that this glue was even more reactive than the products of the other examples so that the pressing time for two 1/16 inch panels when pressed simultaneously in a press opening heated to 260° F. could be reduced from 7.5 minutes to 6.25 minutes. The storage life of the liquid glue without objectionable thickening was also found to exceed considerably that of any of the other examples.

Example VI

This example illustrates the use of metaparacresol in place of phenol and also the procedure of shortening the cooking time and permitting some of the reaction to take place during a relatively extended cooling period. This procedure is of advantage with the highly reactive metaparacresol to permit close control of the reaction so as to obtain the desired viscosity in the product.

|  | Grams |
|---|---|
| Barrett's metaparacresol | 108 |
| Formalin | 203 |
| Caustic soda | 20 |
| Water | 20 |

Ratio to one molecule of phenolic element:

|  | Molecules |
|---|---|
| Formaldehyde | 2.50 |
| Caustic soda | 0.50 |

The mixture was cooked according to the procedure of Example I, except that the reflux-boiling was continued for only 7 minutes and the cooling was conducted slowly so as to occupy 43 minutes. The liquid had a viscosity of about 1000 centipoises and a water content of about 42%.

It was made up into glue with the addition of wood flour and fir plywood was made and tested as in Example I with equally good results.

Example VII

This example illustrates the use of metacresol in place of phenol. It is noted that the total cooking period is very short due to the extreme reactivity of the metacresol.

|  | Grams |
|---|---|
| Barrett's metacresol | 108 |
| Formalin | 203 |
| Caustic soda | 16 |
| Water | 16 |

Ratio to one molecule of phenol:

|  | Molecules |
|---|---|
| Formaldehyde | 2.50 |
| Caustic soda | 0.40 |

This example was cooked in a manner similar to the preceding one except that the heating-up time was only one minute, the reflux-boiling was continued 17 minutes and the cooling occupied 12 minutes. The product had a viscosity of 1650 centipoises and a water content of 42%. It was made up into glue and tested with satisfactory results.

All the foregoing examples illustrate the manufacture of plywood in a hot plate press using a press plate temperature of about 260° F. The utility of my adhesive, however, is not confined to any particular curing temperature or solely to the manufacture of plywood. Its reactivity is such that time and temperature are to a considerable extent interchangeable in the range between 200° F. and 350° F. so that if the time of heating is increased, the temperature for conversion may be correspondingly decreased.

I have also found that in many instances very low mechanical pressure can be used to produce satisfactory bonds. For example, airplane parts can be successfully glued with the foregoing adhesive by what is known as vacuum bag procedure with low mechanical pressure and heat, the mechanical pressure being as low as one atmosphere and the heat for instance being only 200° F. Thus, the extreme reactivity of these glues permits obtaining the advantages of phenolic resin bonds under special conditions such as are common in aircraft manufacture where hitherto it has been necessary to use more reactive types of adhesives.

Equivalent materials

As indicated by the foregoing examples, the phenolic element may be supplied by using pure phenol, the usual technical grades, or the usual commercial grade cresylic acids of high metacresol content as well as technical metaparacresol. Orthocresol and the higher phenols such as xylenol do not appear to be sufficiently reactive to produce satisfactory adhesives. I have tried numerous commercial grades of phenolic materials and find that most of them are satisfactory for the phenolic element in my new adhesive. A few materials, however, do not produce satisfactory results, and, after investigation of their boiling ranges, I am of the opinion that suitable phenolic materials may be described as those having a distillation range between 180° and 220° C. and not containing more than about 15% of either orthocresol or xylenol or both. In the subsequent disclosure and appended claims, it is understood that the expression "a phenol" is used in the broader sense as embracing not only pure phenol but the other phenolic elements which have been defined above.

The formaldehyde is desirably supplied by the use of commercial formalin containing 37% of formaldehyde by weight.

The caustic soda may be replaced either by an amount of sodium carbonate providing equivalent caustic soda for reaction or by the use of caustic potash, although the more expensive potash offers no counterbalancing advantages.

While the compositions described in the foregoing examples represent actual results which have proved entirely satisfactory, it will be readily understood by those skilled in the art of making synthetic resin condensation products that both the reactivity of available commercial materials and the efficiency of equipment for controlling chemical reactions vary considerably and in specific instances it will be necessary to make corresponding small adjustments in formulation and cooking procedures in order to produce a product falling within the desired viscosity range.

The wood flour, while a very desirable material, is not strictly essential and excellent bonds may be produced without its use. I prefer to use it in quantities from about 5% up to about 40% of the resin solids because it improves spreading consistency and also adds to the ability to cheapen the glue by extending it with water, while at the same time it is very effective to counteract any tendency for the glue to penetrate excessively into the wood, particularly when the assembly time is short.

In regard to the water content: it is desirable that this fall within the range of 40 to 75%. The water content, of course, includes the water derived from the formalin.

Critical limits and formulation

I have found that, in order to obtain an adhesive resin of the required properties, it is essential to control simultaneously the molecular ratio of both the formaldehyde and the caustic soda with respect to the phenol within well-defined limits of between about 2 and 3.5 molecules of formaldehyde and between about 0.2 and 1.0 molecule of caustic soda for each molecule of phenol.

If the formaldehyde is reduced below two molecules for each molecule of phenol, the material is not sufficiently reactive and when it is used as a glue such drastic heat treatment is required in the press that it is impossible to avoid the objectionable remoistening of the plywood because the excessive heat treatment which is necessary makes it impossible to retain an adequate commercial moisture content in the assembly at the completion of the pressing.

The same difficulty is encountered within the range of 2 to 3.5 molecules of formaldehyde to one of phenol if the accompanying caustic soda is increased beyond the specified range.

If the formaldehyde is present in excess of 3.5 molecules to one of phenol, even though the caustic soda is kept within the specified range, the plywood bond obtained becomes too low in boil-resistance to pass the exterior plywood test.

In all these three instances, a water-soluble resin can be readily obtained although it does not meet the commercial requirements. If, however, the formaldehyde ratio is kept within the specified range, but the caustic soda content is reduced below the specified limit, the invention becomes inoperative because of inability to produce a water-soluble adhesive. The resin loses its water-solubility during the cooking and the batch separates into an aqueous and an oily phase.

Where a large cooking vessel is available and the required output does not tax the plant capacity, the use of the larger proportions of caustic may be desirable. Commercial formulation will depend to some extent on the ratio between the production desired and the capacity of the equipment. It will thus be seen that, while my invention depends on control of formulation within these critical limits, nevertheless it provides a wide latitude to meet a variety of conditions as indicated by the variations which have been illustrated in the examples.

Attention is particularly directed to Example V and to the secondary, slightly exothermic reaction and the unexpected absence of formaldehyde odor from the product. While I do not wish to assert any single explanation of the phenomena noted, it is my opinion that the elimination of the formaldehyde odor and the secondary, slightly exothermic reaction (which appears to bring this about) are an instance of the Cannizzaro reaction, generally expressed as:

which in this case would take the form of:

the HCOOH further reacting with the NaOH present to form NaCOOH. I find in practice that I can produce this secondary reaction and eliminate formaldehyde odor only if the caustic soda content of the reaction mixture exceeds a certain minimum. I find that when the ratio of formaldehyde to phenol is two molecules to one, the caustic soda content must be at least 0.55 molecule, and when the ratio of formaldehyde to phenol is 3.5 to 1, the caustic soda content must be at least 0.85 molecule, and with intermediate ratios of formaldehyde between 2 and 3.5 molecules, the minimum amount of caustic soda will be proportionate, that is: between .55 and .85 molecule. Within that range, I find that with continued cooking the exothermic reaction will take place and the undesirable odor of formaldehyde will be eliminated. I find this a great advantage, since in general, the reactivity of my resin adhesive is enhanced by increasing the proportion of formaldehyde, but at the same time the odor of formaldehyde is proportionately increased and soon reaches a point where it is very objectionable and requires a special ventilating system in the glue plant. My discovery of this method of eliminating the free formaldehyde has provided a satisfactory solution to this problem whereby I obtain the desired high reactivity and avoid having a material which causes discomfort to the operatives.

*Properties and uses*

The glues of the present invention embody a substantial advance in reactivity for water-soluble phenolic adhesive resins, particularly by attaining the objective of permitting hot pressing at a sufficiently lower temperature and with a sufficiently shorter pressing cycle than hitherto so as to produce water-resistant plywood of desirable moisture content directly from the hot press without need for separate remoistening and without embrittlement of or injury to the wood. This degree of reactivity may be measured by the ability to cure two $\frac{1}{16}$ inch Douglas fir assemblies of veneer having a moisture content not exceeding 6% in eight minutes or less when the two panels are hot pressed simultaneously between press plates at approximately 260° F.

Of course, pressing time for other assemblies will vary with the thickness and conditions of heat transfer. It is noted that this curing rate is a substantial gain in pressing time since former phenolic resins required about fifteen minutes to press the same two assemblies simultaneously with the press plates heated to about 335° F., and, as might be expected, it was impossible under such conditions to avoid remoistening and the attendant disadvantages inescapable from such drastic heat treatment of the wood. It is noted that all the examples exceed this rate by at least one-half minute and Example V exceeds it by one and three-quarters minutes.

An outstanding feature of my invention is the extremely uniform high quality adhesion obtained. Extensive commercial experience and exhaustive testing have indicated that at least in the case of Douglas fir plywood the shear strength, wood failure and boil resistance appear to be consistently maintained at the highest level thus far obtained in plywood manufacture.

Another desirable property which is new for phenolic resin plywood is consistent absence of phenolic odor in the product. This has hitherto been somewhat objectionable, particularly when the panels are used for sheathing enclosures. It seems probable that the absence of odor is the result of the formulation which provides both an excess of formaldehyde to combine with the phenolic element and also a substantial amount of extremely active catalyst in the form of caustic soda as further insurance that substantially all the phenol is combined.

Notwithstanding the extreme reactivity of these water-soluble adhesive resin syrups, they have adequate stability to permit storage for several weeks. In general, the lower viscosities have a longer storage life. The spray dried powder, furthermore, has a storage life of at least six months. Thus, the liquid adhesives, which are somewhat more convenient and economical, can be used with advantage where the market is close to the factory, while the added cost of spray drying is justified for supplying distant markets because the cost of shipping the water is eliminated and the necessary longer storage life is provided.

Due to the excellent flow character of the aqueous resin solutions, satisfactory glue spreading can be obtained over an exceptionally wide range of viscosity, the minimum being about 230 centipoises below which the desired high standard of plywood adhesion is not obtained, and the maximum being about 46,000 centipoises, above which value the material is too viscous for satisfactory spreading. This wide range of viscosity permits meeting an exceptional range of spreading and operating conditions. For the manufacture of fir plywood, a narrower range between approximately 1600 and 2300 centipoises is generally adequate.

I claim:

1. A water-soluble phenolic resin adhesive adapted for making boil-resistant hot press plywood comprising the heat reaction product of a phenol having a distillation range between 180° and 220° C. and not containing more than about 15% of at least one phenol selected from the group consisting of orthocresol, xylenol, and mixtures thereof, formaldehyde and caustic soda, in proportions of substantially between 2 and 3.5 molecules of formaldehyde and between 0.2 and 1.0 molecule of caustic soda for each molecule of the phenol.

2. A water-soluble aqueous phenolic resin adhesive adapted for making boil-resistant hot press plywood comprising a viscous syrup which is the heat reaction product of a phenol having a distillation range between 180° and 220° C. and not containing more than about 15% of at least one phenol selected from the group consisting of orthocresol, xylenol, and mixtures thereof, formaldehyde and caustic soda, in proportions of substantially between 2 and 3.5 molecules of formaldehyde and between 0.2 and 1.0 molecule of caustic soda for each molecule of the phenol, and said aqueous adhesive having a viscosity between 230 and 46,000 centipoises.

3. A water-soluble phenolic resin adhesive adapted for making boil-resistant hot press plywood comprising a viscous syrup which is the heat reaction product of a phenol having a distillation range between 180° and 220° C. and not containing more than about 15% of at least one phenol selected from the group consisting of orthocresol, xylenol, and mixtures thereof, formaldehyde and caustic soda, in proportions of substantially between 2 and 3.5 molecules of formaldehyde and between 0.2 and 1.0 molecule of caustic soda for each molecule of the phenol, and having a viscosity between 230 and 46,000 centipoises, and a water content between 40% and 75%.

4. A water-soluble phenolic resin adhesive adapted for making boil-resistant hot press plywood comprising the heat reaction product of a phenol having a distillation range between 180° and 220° C. and not containing more than about 15% of at least one phenol selected from the group consisting of orthocresol, xylenol, and mixtures thereof, formaldehyde and caustic soda, in proportions of about 3 molecules of formaldehyde and about 0.75 molecule of caustic soda for each molecule of the phenol, and having a pleasant aromatic slightly alcoholic odor and being free from the odor of formaldehyde.

5. A water-soluble thermosetting phenol-formaldehyde resin adhesive, said adhesive comprising the reaction product of 2 to 3.5 molecules of formaldehyde and 0.55 to 1.0 molecule of caustic soda to each molecule of phenol, and having a pleasant aromatic slightly alcoholic odor and being substantially free from the odor of formaldehyde.

6. Hot pressed plywood glued with a phenolic resin bond as described in claim 1 and having a moisture content upon removal from the hot press of upwards of 6%.

7. The method of making a water-soluble phenolic resin adhesive adapted for the manufacture of boil-resistant hot press plywood which comprises cooking in the presence of water under a reflux a mixture of a phenol having a distillation range between 180° and 220° C. and not containing more than about 15% of at least one phenol selected from the group consisting of orthocresol, xylenol, and mixtures thereof, formaldehyde and caustic soda in the proportions of between 2 and 3.5 molecules of formaldehyde and between 0.2 and 1.0 molecule of caustic soda for each molecule of the phenol and continuing said reflux cooking until the aqueous reaction product on cooling has a viscosity of between 230 and 46,000 centipoises.

8. The method of making a water-soluble phenolic resin adhesive adapted for the manufacture of boil-resistant hot press plywood which comprises cooking in the presence of water under a reflux a mixture of a phenol having a distillation range between 180° and 220° C. and not containing more than about 15% of at least one phenol selected from the group consisting of orthocresol, xylenol, and mixtures thereof, formaldehyde and caustic soda in the proportions of between 2 and 3.5 molecules of formaldehyde and between 0.2 and 1.0 molecule of caustic soda for each molecule of the phenol and continuing said reflux cooking until the aqueous reaction product on cooling has a viscosity of between 230 and 46,000 centipoises, and mixing the adhesive with up to 40% of fine wood flour on the basis of resin solids present to form a spreadable liquid glue which upon hot pressing with short assembly time is free from a tendency to excess penetration into the plies.

9. The method of making a water-soluble phenol-formaldehyde resin adhesive adapted for the manufacture of boil-resistant hot press plywood and substantially free from the odor of formaldehyde, which comprises cooking in the presence of water under a reflux a mixture of phenol, formaldehyde and caustic soda in the proportions of between 2 and 3.5 molecules of formaldehyde and between .55 and 1.0 molecule of caustic soda for each molecule of phenol, and continuing said reflux cooking at least until the completion of a secondary slightly exothermic reaction whereby the odor of formaldehyde disappears from the aqueous reaction product and upon cooling a material is obtained having a viscosity between 230 and 46,000 centipoises.

10. A water-soluble phenolic resin adhesive adapted for making boil-resistant hot press plywood comprising the heat reaction product of a phenol having a distillation range between 180° and 220° C. and not containing more than about 15% of at least one phenol selected from the group consisting of orthocresol, xylenol, and mixtures thereof, formaldehyde and caustic soda in proportions of substantially between 2 and 3.5 molecules of formaldehyde and between 0.55 and 1.0 molecule caustic soda for each molecule of the phenol, said reaction product being substantially free from the odor of formaldehyde.

11. A water-soluble dry powdered phenolic resin glue base as described in claim 1.

12. A water-soluble dry powdered phenolic resin glue base as described in claim 1, said dry glue base upon solution in about 0.6 part of water yielding a liquid adhesive having a viscosity between 230 and 46,000 centipoises.

13. A water-soluble phenolic resin adhesive according to claim 1 in which the phenol employed is phenol.

14. A water-soluble dry powdered phenolic resin glue base as described in claim 1 in which the phenol employed is phenol.

15. Hot pressed plywood glued with a phenolic resin bond as described in claim 1 in which the phenol employed is phenol and having a moisture content of upwards of 6%.

16. A water-soluble dry powdered phenolic resin glue base as described in claim 5.

17. Hot pressed plywood glued with a phenolic resin bond as described in claim 5 and having a moisture content upon removal from the hot press of upwards of 6%.

18. A water-soluble phenolic resin adhesive according to claim 1 in which the phenol employed is metacresol.

19. A water-soluble dry powdered phenolic resin glue base as described in claim 1 in which the phenol employed is metacresol.

20. Hot pressed plywood glued with a phenolic resin bond as described in claim 1 in which the phenol employed is metacresol and having a moisture content upon removal from the hot press of upwards of 6%.

CLARENCE F. VAN EPPS.